United States Patent [19]

Dixon

[11] Patent Number: 4,858,889
[45] Date of Patent: Aug. 22, 1989

[54] CAMBER ADJUSTING TOOL FOR FRONT-WHEEL DRIVE VEHICLES

[76] Inventor: Richard L. Dixon, 715 E. Geer St., Durham, N.C. 27701

[21] Appl. No.: 284,694

[22] Filed: Dec. 15, 1988

[51] Int. Cl.⁴ .............................................. B66F 1/00
[52] U.S. Cl. .................................................. 254/131
[58] Field of Search ............... 254/131, 120, 129, 130, 254/25, 17; 29/267; 81/488; 7/100, 166

[56] References Cited

U.S. PATENT DOCUMENTS

| | | | |
|---|---|---|---|
| 3,612,485 | 10/1971 | McAfee | 254/130 |
| 3,680,834 | 8/1972 | Holloway | 254/25 |
| 3,840,211 | 10/1974 | Castoe | 254/131 |
| 4,303,224 | 12/1981 | Nelson | 254/131 |
| 4,364,288 | 12/1982 | Castoe | 81/488 |

Primary Examiner—Robert C. Watson
Attorney, Agent, or Firm—Neil F. Markva

[57] ABSTRACT

A hand tool adjusts the camber of a wheel assembly on a front-end drive vehicle including a vertically disposed spring-loaded strut portion located between a partition or fender apron and a front-wheel. The tool includes an elongated handle section, a fulcrum section and a wheel assembly contacting section. The wheel assembly contacting section includes a strut portion bearing surface transversely disposed at an outer end of a bearing surface support which projects outwardly from a first side and at one end of the fulcrum section. The elongated handle section is connected to the fulcrum section at a location laterally spaced from the bearing surface support and projects outwardly from the first side of the fulcrum section. The handle, fulcrum and wheel assembly contacting sections are substantially disposed in a common plane. The fulcrum section includes a fulcrum bearing surface on a second side of the fulcrum section opposite the first side thereof. The fulcrum bearing surface is substantially flat along the second side and effective to abut a partition member or fender apron disposed between the engine compartment and the wheel assembly in a front-end drive vehicle.

17 Claims, 2 Drawing Sheets

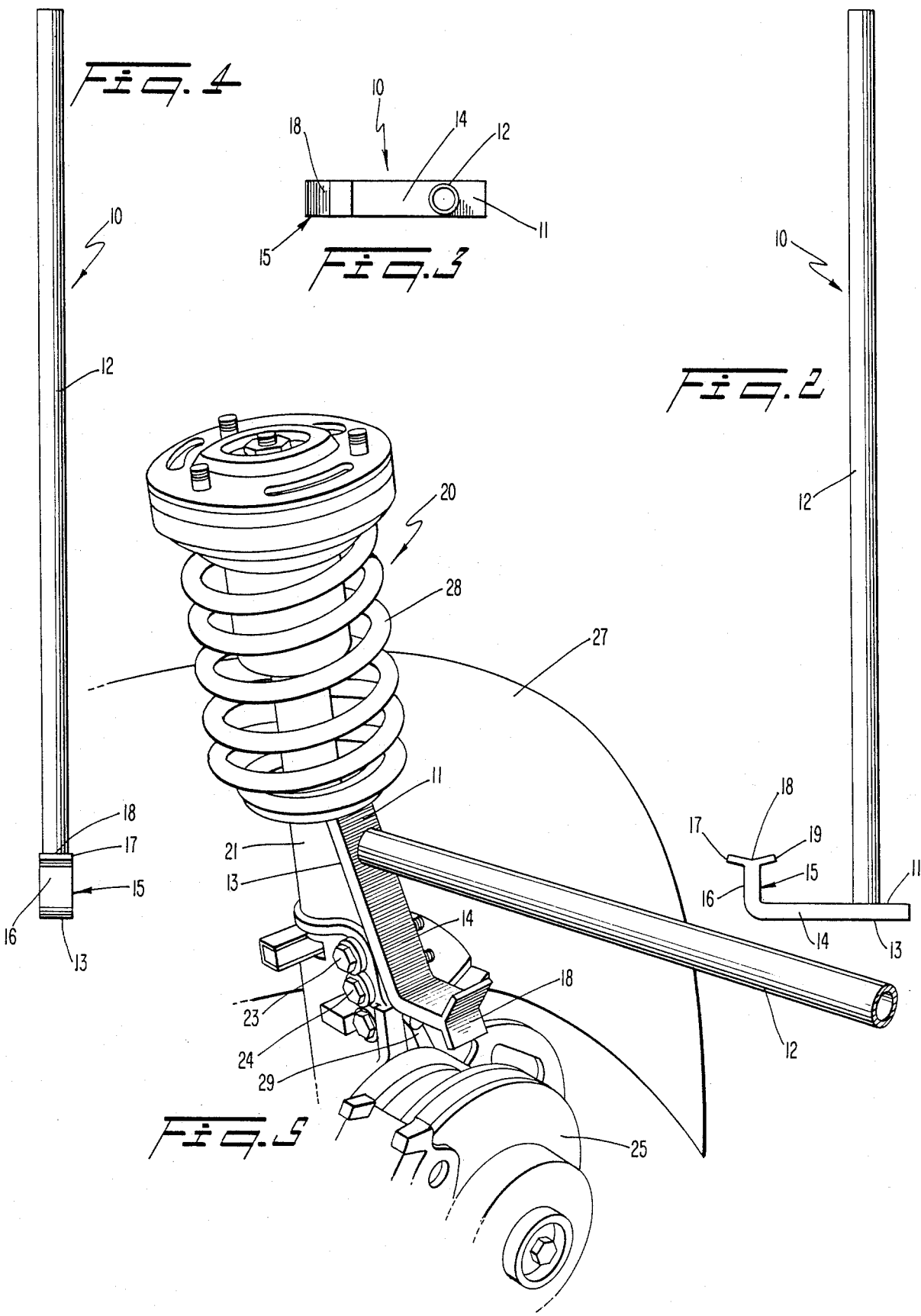

CAMBER ADJUSTING TOOL FOR FRONT-WHEEL DRIVE VEHICLES

FIELD OF THE INVENTION

This invention relates to a camber adjusting tool useful in effecting the front-end alignment of vehicles. More particularly, this invention relates to a camber adjusting tool for a front-wheel drive vehicle having a McPherson suspension wheel assembly.

BACKGROUND OF THE INVENTION

Camber adjustment devices for adjusting the camber of wheels when periodically aligning the front-end of a vehicle are well known. Such prior art devices are able to adjust the amount of tilt for the front wheels from the top to the bottom. Such devices are disclosed in U.S. Pat. Nos. 3,537,685; 3,811,654; 3,840,211; 3,915,431; and 4,303,224. While these U.S. Patents disclose various devices for adjusting camber and caster during front-end alignment of vehicles, none of them specifically relate to the adjusting of the front-end camber for a front-wheel drive vehicle.

U.S. Pat. No. 3,915,431 discloses a camber adjusting device having an elongated contact member for contacting the upper inner arm or shaft of a vehicle wheel assembly. In this instance, the inner arm is disposed horizontally within the wheel assembly and the fulcrum member must extend at an obtuse angle from the contact member and rest upon a fulcrum point of the vehicle during use of the camber adjusting device. An elongated handle extends from the fulcrum member at the end remote the contact member.

The fulcrum means of U.S. Pat. No. '431 includes a curved lower surface for placement on a fulcrum point of the vehicle. A heel member includes the curved lower surface and extends outwardly from and along the fulcrum rod on the opposite side of the rod relative the contact member. The heel member constitutes a portion of the fulcrum member that extends outwardly and past the elongated contact member adjacent the fulcrum member. The shape and specific placement of the fulcrum member and the configuration of the contact member precludes use of this prior art device in adjusting the vertically disposed, spring-loaded strut portion of a McPherson wheel suspension assembly as found on General Motors cars since 1982 to the present models.

None of the other camber adjustment devices as found in the prior art are suitable for adjusting the camber of a vertically disposed, spring-loaded strut portion found in a McPherson front-end wheel suspension assembly.

In the McPherson suspension system used on front-wheel drive General Motors automobiles, a strut bracket, located at the bottom end of a vertically disposed strut member, includes elongated holes. Two bolts connect the bracket to a spindle or knuckle link secured to the wheel designed to tilt at a particular camber angle from top to bottom of the front wheel with respect to the vertical. Once the bolts are loosened, the manufacturer's manual suggests the manual grabbing of the vertically disposed spring-loaded strut portion and causing it to move. Thus, the wheel camber is supposed to be adjusted manually moving the vertical disposition of the spring-loaded strut portion.

However, if the vehicle use has been abusive and corrosive, such as use in snow and salt, it may be very difficult and time consuming to move the strut portion after the bolts are loosened. It sometimes requires loosening to a point where the wheel will tend to flop around in the hands. Then, the wheel must be held in position while tightening the two bolts at the final adjustment of the front-end. This is a time consuming operation and can become quite frustrating.

The manual adjustment of the front-wheel, once loosened, is accomplished by jacking the car up, loosening the bolts to where the tire can be grasped and moved around. Such an operation cannot be done while the vehicle sits on the ground with its weight on the tires. That is, the strut assembly cannot be manually moved to effect the camber adjustment while the car is sitting on the ground.

Once the strut assembly adjustment bolts are loosened to adjust the camber, the weight of the vehicle naturally causes pressure tending to push the bottom of the vertically disposed strut portion inwardly toward the partition or fender apron disposed between the wheel assembly and the vehicle engine compartment. At the same time, to monitor the camber adjustment for the front-wheels, a wheel gage is mounted on the tire. Thus, when the weight of the wheel is sitting on the ground and the bolts are loosened, it is possible the inwardly directed pressure will cause the tire to flop inside and the wheel gage mounted on the tire could be knocked off and ruined.

PURPOSE OF THE INVENTION

The primary object of this invention is to provide a hand tool for adjusting the camber of a front-wheel drive vehicle having a McPherson strut suspension system. A further object of the invention is to provide a hand tool for adjusting the camber of front wheels on a front-wheel drive vehicle without necessarily having to remove the tires of the vehicle.

Another object of the invention is to provide a hand tool for adjusting the front-wheel camber of a front-wheel drive automobile while allowing both hands to be free to effect a tightening of the adjusting bolts on the suspension system for the wheel assembly of such vehicle.

A still further object of the invention is to avoid inherent problems associated with prior art methods of adjusting the front-wheel camber on front-wheel drive vehicles.

Another object of the invention is to provide a camber adjustment device usable between the top of the tire and bottom of the fender while leaving the tire resting on a surface.

SUMMARY OF THE INVENTION

The hand tool of the invention comprises a structural configuration including an elongated handle section, a fulcrum section and a wheel assembly contacting section. The wheel assembly contacting section includes a strut portion bearing surface transversely disposed at an outer end of contacting surface support means projecting outwardly from a first side and at one end of the fulcrum section. The elongated handle section is connected to the fulcrum section at a location laterally spaced from the contacting surface support means and projects outwardly from the first side of the fulcrum section. The handle, fulcrum and wheel assembly contacting sections are disposed in a common plane.

The fulcrum section includes a fulcrum bearing surface on a second side of the fulcrum section opposite said first side thereof. The fulcrum bearing surface is substantially flat along the second side and is effective to abut partition means located between the wheel assembly and the engine compartment of the front-end drive vehicle. The hand tool is used for adjusting the camber of a wheel assembly on a front-end drive vehicle which includes a vertically disposed spring-loaded strut member located between the partition means and front wheel of the vehicle.

A particular feature of the hand tool structure is directed to the elongated handle section, fulcrum section and wheel assembly contacting section which together form a generally J-shaped structural configuration. The strut portion bearing surface is shaped to generally conform to a circumferential shape along the spring-loaded strut portion of a McPherson suspension wheel assembly. The handle section has a length sufficient to extend outwardly beyond the vehicle wheel which carries a tire when the substantially flat fulcrum bearing surface is contiguous to the partition means of the vehicle and the strut portion bearing surface is in contact with the vertically disposed strut portion of the suspension assembly.

A further feature of the hand tool is that the handle section extends outwardly from the fulcrum section a length greater than about 24 inches and up to about 31 inches. This allows the handle section to protrude outwardly from above the tire for the user to place the protruding handle section under the arm to free the user's hands for adjusting the bolt tightness connecting the spring-loaded strut member to the wheel carrying the tire.

Another feature of the hand tool is directed to the structural configuration composed of metal with the fulcrum section having a rectangular cross-section and a handle section having a circular cross-section and being welded to the fulcrum section. The handle section is thereby fixedly connected and substantially perpendicular to the fulcrum section at a location laterally spaced inwardly from a free end of the fulcrum section to form an extension section effective to slidingly engage beneath a coil spring saddle disposed on the vertically disposed strut member of the suspension assembly.

The fulcrum bearing surface is disposed along the bracket connection of vertically disposed strut portion. With the extension section beneath the spring saddle, the strut member can be tilted inwardly with respect to the partition means when pressure is exerted downwardly on the handle section.

In a specific embodiment, the round cross-section of the handle section has an outside diameter of about ⅞ of an inch. The contacting surface support means is about ½ of an inch thick and about 1 inch wide. The strut portion bearing surface extends outwardly from each side of the ½ inch thickness of the contacting surface support and is about 1 inch wide within the common plane including the handle, fulcrum and wheel assembly contacting sections. When the structural configuration of the hand tool is composed of metal, the overall weight of the structural configuration is in the range from about 4 to about 6 pounds. The extension section projects outwardly about 1 inch from the handle section.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 2 is a side elevational view of a hand tool made in accordance with the invention;

FIG. 3 is a top plan view of the tool as shown in FIG. 2;

FIG. 4 is a front. elevational view from the left side of the hand tool as shown in FIG. 2;

FIG. 5 is a perspective view showing the hand tool of the invention in place for effecting a further adjustment of the camber in a front-wheel drive vehicle.

DETAILED DESCRIPTION OF INVENTION

Figure 1:
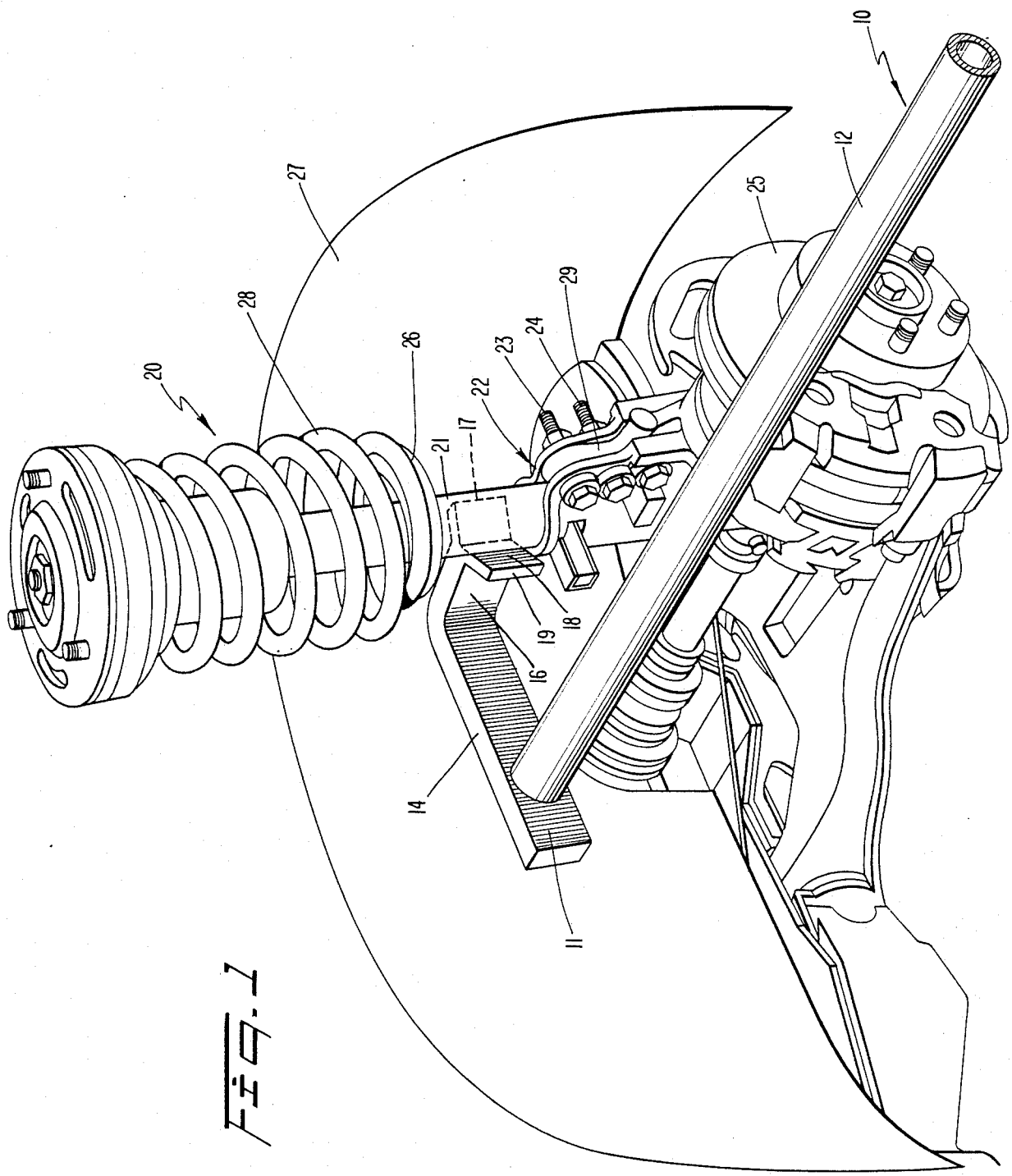
FIG. 1 is a perspective view showing a hand tool of the invention in place for adjusting the camber of a front-wheel drive vehicle.

The hand tool, generally designated 10, includes a handle section 12, a fulcrum section 14 and a wheel assembly contacting section, generally designated 15. A strut portion bearing surface 18 is transversely disposed at an outer end of a bearing surface support member 16 projecting outwardly from a first side and at one end of fulcrum section 14. The elongated handle section 12 is connected to fulcrum section 14 at a location laterally spaced from the bearing surface support 16 and projects outwardly from the first side of fulcrum section 14. Handle section 12, fulcrum section 14 and wheel assembly contacting section 15 are substantially disposed in a common plane as shown.

Fulcrum section 14 includes fulcrum bearing surface 13 on a second side of fulcrum section 14 opposite the first side thereof. Fulcrum bearing surface 13 is substantially flat along the second side and is effective to abut partition or fender apron 27 of a front-end drive vehicle. Partition or apron 27 is disposed between the engine compartment and wheel assembly 20.

Handle section 12, fulcrum section 14 and wheel assembly contacting section 15 form a generally J-shaped and one-piece integrally formed structural configuration. Strut portion bearing surface 18 is shaped to generally conform to a circumferential shape of the spring-loaded strut portion. While FIG. 1 shows hand tool 10 in contact with strut member 21, the bearing surface 18 is also shaped to contact the outer circumferential shape of spring saddle 26 which supports spring 28 within the McPherson strut suspension assembly, generally designated 20.

Handle section 12 extends outwardly from fulcrum section 14 a length of greater than about 24 inches. In this specific embodiment, hand tool 10 is composed of metal, handle section 12 has a circular cross-section, is hollow, has a length of about 31 inches measured from the first side of fulcrum section 14, and has an outside diameter of about ⅞ of an inch. Fulcrum section 14 has a rectangular cross-section and is welded to handle section 12. In this specific embodiment the overall weight of such structural configuration is in the range from about 4 to about 6 pounds. Fulcrum section 14 is about 5½ inches long and strut portion bearing surface 18 is spaced from fulcrum bearing surface 13 by a distance of about 2 inches. Fulcrum section 14 is about ½ inch thick measured from the first side to the second side thereof and is about 1 inch wide. Extension section 11 projects outwardly about 1 inch from handle section 12.

Fulcrum section 14 includes an extension section 11 that projects outwardly in a direction away from the bearing surface support 16 behind handle section 12 and in the same common plane. The vertically disposed spring-loaded strut portion 20 includes a spring saddle 26 disposed around a vertically disposed strut member 21 for supporting a compression spring 28.

As shown in FIG. 5, extension section 11 is effective to slidingly engage beneath spring saddle 26 when fulcrum bearing surface 13 is disposed against bracket 22 of strut portion 20 to tilt strut member 21 inwardly with respect to partition 27 when bolts 23 and 24 are loosened in a known manner in the wheel alignment art. To move strut portion 20 inwardly, pressure is exerted downwardly on handle section 12 when extension section 11 is disposed beneath spring saddle 26.

Bearing surface support 16 is about ½ of an inch thick and about 1 inch wide. Strut portion bearing surface 18 extends outwardly from each side of the ½ inch thickness of bearing surface support 16 to form flange elements 17 and 19. The strut portion bearing surface 18 is about 1 inch wide within the common plane.

Handle section 12 is substantially perpendicular to fulcrum section 14. It is contemplated that the end of handle section 12 remote from fulcrum section 14 may include an outer gripping member.

In operation, to move the vertically disposed strut portion 20 outwardly with respect to partition 27, fulcrum bearing surface 13 is contiguously disposed against partition 27 with the strut portion bearing surface 18 contiguously disposed behind the strut assembly as shown. The bearing surface 18 may be placed against the outer circumferential surface of strut 21 or the outer circumferential surface of spring saddle 26.

Upon loosening bolts 23 and 24, the elongated lower hole for bolt 24 in bracket 22 allows the relative position between bracket 22 and spindle 26 to be changed and set in accordance with gages riding on a tire as is well known in the art of wheel alignment. For clarity, While the drawings show wheel support 25 without a tire. Hand tool 10 may be used in the fashion which precludes the necessity of removing the tire from the wheel to effect adjustment of the strut assembly 20 as described above.

While the camber adjusting tool for front-wheel drive vehicles has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A hand tool for adjusting the camber of a wheel assembly on a front-end drive vehicle including a vertically disposed spring-loaded strut portion located between a partition means and a front wheel, said tool comprising:
   (a) a structural configuration including an elongated handle section, a fulcrum section, and a wheel assembly contacting section,
   (b) said wheel assembly contacting section including a strut portion bearing surface transversely disposed at an outer end of bearing surface support means projecting outwardly from a first side and at one end of the fulcrum section,
   (c) said elongated handle section being connected to the fulcrum section at a location laterally spaced from the bearing surface support means and projecting outwardly from said first side of the fulcrum section with the handle, fulcrum and wheel assembly contacting sections being substantially disposed in a common plane,
   (d) the fulcrum section including a fulcrum bearing surface on a second side of the fulcrum section opposite said first side thereof,
   (e) said fulcrum bearing surface being substantially flat along said second side and being effective to abut said partition means of the front-end drive vehicle.

2. A hand tool as defined in claim 1 wherein
   the elongated handle section, fulcrum section and wheel assembly contacting section form a generally J-shaped structural configuration.

3. A hand tool as defined in claim 1 wherein
   said handle section, fulcrum section and wheel assembly contacting section are integrally formed as a one-piece structural configuration.

4. A hand tool as defined in claim 1 wherein
   the strut portion bearing surface is shaped to generally conform to a circumferential shape of the spring-loaded strut portion.

5. A hand tool as defined in claim 1 wherein
   said front-end drive vehicle includes a McPherson suspension assembly including a vertically disposed spring-loaded strut portion located between said front wheel and partition means,
   said handle section having a length sufficient to extend outwardly beyond the vehicle wheel carrying a tire when the fulcrum bearing surface is contiguous to the partition means and the strut portion bearing surface is in contact with the vertically disposed strut portion of the suspension assembly.

6. A hand tool as defined in claim 5 wherein
   the handle section extends outwardly from the fulcrum section a length of greater than about 24 inches.

7. A hand tool as defined in claim 5 wherein
   the structural configuration is composed of metal, and
   the fulcrum section has a rectangular cross-section and the handle section has a circular cross-section and is welded to the fulcrum section.

8. A hand tool as defined in claim 7 wherein
   the circular cross-section of the handle section has an outside diameter of about ⅝ of an inch.

9. A hand tool as defined in claim 5 wherein
   the handle section is fixedly connected to the fulcrum section at a location laterally spaced inwardly from a free end of the fulcrum section to form an extension section effective to slidingly engage beneath a spring disposed on a strut member of the vertically disposed strut portion when the fulcrum bearing surface is disposed substantially parallel to and along the vertically disposed strut portion to allow the strut portion to be tilted inwardly with respect to the partition means when pressure is exerted downwardly on the handle section.

10. A hand tool as defined in claim 1 wherein
    the fulcrum section is about 5½ inches long, the strut portion bearing surface is spaced from the fulcrum bearing surface by a distance of about 2 inches, and the handle section has a length of about 31 inches long measured from said first side of the fulcrum section.

11. A hand tool as defined in claim 10 wherein the fulcrum section is about ½ inch thick measured from said first side to said second side of the fulcrum section which is about 1 inch wide.

12. A hand tool as defined in claim 11 wherein the fulcrum section includes an extension section that projects outwardly beyond the handle section and in the same common plane, said vertically disposed spring-loaded strut portion includes a spring saddle disposed around a vertically disposed strut portion for supporting a compression spring, said extension section being effective to slidingly engage beneath said spring saddle when the fulcrum bearing surface is disposed to tilt the strut member inwardly with respect to the partition means when pressure is exerted downwardly on the handle section.

13. A hand tool as defined in claim 12 wherein the extension section projects outwardly about 1 inch from the handle section.

14. A hand tool as defined in claim 1 wherein the bearing surface support means is about ½ inch thick and about 1 inch wide, and the strut portion bearing surface extends outwardly from each side of the ½ inch thickness of the bearing surface support means and is about 1 inch wide within said common plane.

15. A hand tool as defined in claim 1 wherein the handle section is substantially perpendicular to the fulcrum section.

16. A hand tool as defined in claim 1 wherein the end of the handle section remote from the fulcrum section includes an outer gripping member.

17. A hand tool as defined in claim 1 wherein the overall weight of the structural configuration is in the range of from about 4 to about 6 lbs.

* * * * *